(12) United States Patent
Ackerman et al.

(10) Patent No.: US 8,047,023 B2
(45) Date of Patent: Nov. 1, 2011

(54) METHOD FOR PRODUCING TITANIA-DOPED FUSED SILICA GLASS

(75) Inventors: Bradford Giles Ackerman, Scurry, TX (US); Kenneth Edward Hrdina, Horseheads, NY (US); Lisa Anne Moore, Corning, NY (US); Nikki Jo Russo, Gouverneur, NY (US); C. Charles Yu, Cheshire, CT (US)

(73) Assignee: Corning Incorporated, Corning, NY (US)

( * ) Notice: Subject to any disclaimer, the term of this patent is extended or adjusted under 35 U.S.C. 154(b) by 1525 days.

(21) Appl. No.: 09/844,947

(22) Filed: Apr. 27, 2001

(65) Prior Publication Data
US 2002/0157421 A1 Oct. 31, 2002

(51) Int. Cl.
*C03B 37/014* (2006.01)
(52) U.S. Cl. .............. 65/399; 65/413; 65/426; 65/427
(58) Field of Classification Search ............. 65/399, 65/413, 426, 427
See application file for complete search history.

(56) References Cited

U.S. PATENT DOCUMENTS

| | | | |
|---|---|---|---|
| 2,326,059 A | 8/1943 | Nordberg | |
| 3,806,570 A * | 4/1974 | Flamenbaum et al. | 264/66 |
| 4,419,116 A * | 12/1983 | Nakahara et al. | 65/414 |
| 4,440,558 A | 4/1984 | Nath et al. | |
| 5,067,975 A | 11/1991 | Backer et al. | 65/3.12 |
| 5,152,819 A * | 10/1992 | Blackwell et al. | 65/3.12 |
| 5,423,898 A * | 6/1995 | Terashima et al. | 65/381 |
| 5,425,795 A * | 6/1995 | Koide et al. | 65/414 |
| 6,242,136 B1 | 6/2001 | Moore et al. | 430/5 |
| 6,265,115 B1 | 7/2001 | Berkey et al. | 430/5 |
| 6,606,883 B2 | 8/2003 | Hrdina et al. | 65/17.4 |
| 6,672,110 B2 * | 1/2004 | Roba et al. | 65/384 |

FOREIGN PATENT DOCUMENTS

| | | |
|---|---|---|
| WO | WO 98/39496 | 9/1998 |
| WO | WO 99/15468 | 4/1999 |
| WO | WO 99/54259 | 10/1999 |
| WO | WO 01/07967 | 2/2001 |
| WO | WO 01/08163 | 2/2001 |

\* cited by examiner

*Primary Examiner* — John Hoffmann
(74) *Attorney, Agent, or Firm* — Walter M. Douglas; Timothy M. Schaeberle

(57) ABSTRACT

A method for producing a fused silica glass containing titania includes synthesizing particles of silica and titania by delivering a mixture of a silica precursor and a titania precursor to a burner, growing a porous preform by successively depositing the particles on a deposition surface while rotating and translating the deposition surface relative to the burner, and consolidating the porous preform into a dense glass.

14 Claims, 2 Drawing Sheets

METHOD FOR PRODUCING TITANIA-DOPED FUSED SILICA GLASS

BACKGROUND OF THE INVENTION

1. Field of the Invention

The invention relates generally to methods for producing doped glass. More specifically, the invention relates to a method for producing a titania-doped fused silica glass and a titania-doped fused silica glass having low water content.

2. Background Art

Extreme ultraviolet (EUV) lithography is emerging as one of the next-generation lithography techniques that will allow high-volume production of integrated circuits with sub-100-nm features. EUV lithography as currently contemplated involves producing electromagnetic radiation at around 13 nm. The EUV radiation may be produced, for example, using a 1064-nm neodymium-YAG laser which produces a xenon gas plasma or from a synchrotron source. A condenser collects the EUV radiation and projects it onto a mask containing a pattern to be replicated on a silicon wafer. The mask reflects the EUV radiation into an imaging system, which then projects an image onto a resist-coated silicon wafer. The pattern is later transferred to the silicon wafer by etching.

The mask structure consists of a substrate ("mask blank"), a reflective multilayer stack formed on the mask blank, and an absorber formed on the multilayer stack. Typically, the multilayer stack includes alternating layers of Mo and Si or Mo and Be. The absorber defines the pattern to be replicated on the silicon wafer. The mask blank may be made of silicon or glass or other suitable material. It is important that the mask blank has a low thermal expansion so that it does not distort under exposure to the EUV radiation. Titania-doped fused silica ($SiO_2$—$TiO_2$) is one example of a glass that can be made to have a very low thermal expansion, i.e., lower than pure fused silica with the potential for a coefficient of thermal expansion that approximates zero. The coefficient of thermal expansion of the $SiO_2$—$TiO_2$ glass can be controlled by adjusting the percent weight content of $TiO_2$ in the glass.

Commercial processes for producing $SiO_2$—$TiO_2$ glass involve transporting a mixture of a silica precursor and a titania precursor to a reaction site, thermally decomposing the mixture of precursors (usually via flame hydrolysis) into $SiO_2$—$TiO_2$ particles ("soot"), and depositing the soot on a support. In the conventional boule process, the soot is captured in a cup of a refractory furnace at consolidation temperatures (typically 1200 to 1900° C.) so as to allow the soot to immediately consolidate into a solid body ("boule"). These high consolidation temperatures may result in compositional variations within the glass, which would result in the glass having non-uniform thermal expansion properties. Applications such as EUV lithography require very low variations in coefficient of thermal expansion (CTE) within the substrate (e.g., 0±5 ppb/° C.). Therefore, a production method which favors homogeneity in the $SiO_2$—$TiO_2$ glass is desirable.

For environmental reasons, commercial processes for producing $SiO_2$—$TiO_2$ glass use a chloride-free material such as octamethylcyclotetrasiloxane (OMCTS), a siloxane, as a silica precursor. Usage of organic precursors and a hydrogen-containing fuel for thermal decomposition of the organic precursors inherently results in the $SiO_2$—$TiO_2$ glass containing more OH (often referred to as water) than can be tolerated by infrared transmission applications or deep-UV applications such as at 157 nm. In particular, OH has some absorption at these wavelengths. Therefore, a production method which favors dehydration of the $SiO_2$—$TiO_2$ glass is also desirable.

SUMMARY OF THE INVENTION

In one aspect, the invention relates to a method for producing a fused silica glass containing titania. The method comprises synthesizing particles of silica and titania by delivering a mixture of a silica precursor and a titania precursor to a burner, growing a porous preform by successively depositing the particles on a deposition surface while rotating and translating the deposition surface relative to the burner, consolidating the porous preform into a dense glass.

In another aspect the method of the invention is directed to synthesizing particles of silica and titania by delivering a mixture of a silica precursor and a titania precursor to a burner, growing a porous preform by successively depositing the particles on a deposition surface (herein also called a "bait") while rotating and translating the deposition surface relative to the burner, consolidating the porous preform into a partially dense glass.

Other aspects and advantages of the invention will be apparent from the following description and the appended claims.

DETAILED DESCRIPTION OF THE INVENTION

Embodiments of the invention provide a method for producing $SiO_2$—$TiO_2$ glass substrates with low variations in CTE within the substrate. The method involves transporting silica and titania precursors in vapor form to deposition burners. The precursors exit the deposition burners where they react to form fine $SiO_2$—$TiO_2$ particles ("soot"). The soot collects on a deposition surface to form a porous preform. The method further includes consolidating the porous preform to give a dense $SiO_2$—$TiO_2$ glass in a separate step. Consolidating the glass in a separate step eliminates the need to capture the soot at consolidation temperatures. This allows the soot to be deposited at lower temperatures (typically, 200° C. to 500° C. lower) than possible with the conventional boule process. That is, the silica and titania particles are deposited at a temperature below that required to consolidate the porous perform into dense glass. $SiO_2$—$TiO_2$ glass having low OH content can be produced by exposing the preform to a dehydrating agent, such as chlorine or fluorine, prior to consolidation. Chlorine and/or fluorine treatment would also remove impurities from the glass which could result in seeds.

In one embodiment of the invention, production of $SiO_2$—$TiO_2$ glass follows the same basic procedure as a conventional vapor-axial deposition (VAD) process, except that two delivery systems are needed to provide entrained vapors of titania precursor and silica precursor. The two separate vapor trains feed into a manifold where they are mixed together. The mixture is then carried through fume lines to deposition burners where it reacts to form soot. The soot is deposited on a bait which is rotated and moved axially within an enclosure. The porous preform formed by the soot is thermally consolidated into dense glass in a separate step. An intermediate chlorine and/or fluorine treatment step may be used to remove impurities or adsorbed water from the glass. Relatively large homogeneous SiO$_2$—TiO$_2$ glass substrates, e.g., 6"×6"×0.25" substrates and larger, can be made using this process.

Figure 1:
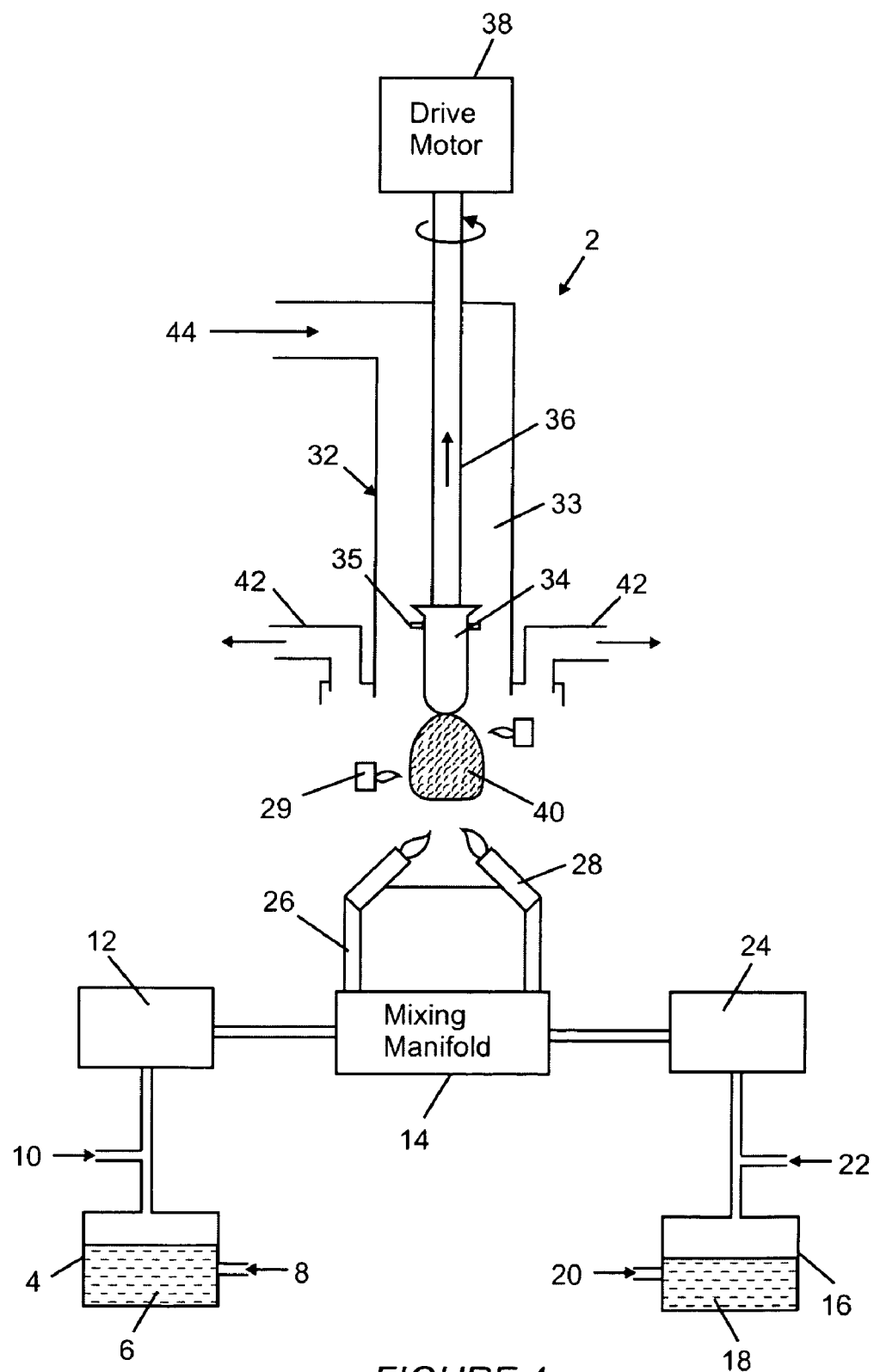
FIG. 1 is a schematic of a system for producing SiO2—TiO2 glass in accordance with one embodiment of the invention.

FIG. 1 is a schematic of a system, generally designated by the numeral 2, for use in practicing the present invention. The system 2 includes source 4 of a silica precursor 6. There are many choices available for the silica precursor, e.g., a siloxane such as OMCTS (Si$_4$O$_4$(CH$_3$)$_8$), halogen-based precursors such as silicon tetrachloride (SiCl$_4$), silane (SiH$_4$), and other silicon-containing compounds. In general, halogen-free precursors are preferred because they are more environmentally friendly. Silane exists in vapor form at room temperature and does not need a vaporization step prior to mixing with the titania precursor. The silica precursor 6 is pumped into the source 4 at a predetermined rate. The source 4, which may be a vaporizer or evaporator tank or similar equipment, converts the silica precursor 6 into vapor form if the silica precursor 6 is not already in vapor form. An inert carrier gas 8, e.g., nitrogen, carries the silica precursor 6 vapors through a distribution system 12 to a manifold 14. A stream of inert gas 10, e.g., nitrogen, is brought into contact with the silica precursor 6 vapors to prevent saturation.

The system 2 further includes a source 16 of the titania precursor 18, e.g., a titanium alkoxide such as titanium isopropoxide (Ti(OPri)$_4$). The titania precursor 18 is pumped into the source 16 at a predetermined rate. The source 16 converts the titania precursor 18 into vapor form if the titania precursor 18 is not already in vapor form. A stream of inert gas 22, e.g., nitrogen, can be brought into contact with the vaporous titania precursor to prevent saturation of the vapors. An inert carrier gas 20, e.g., nitrogen, entrains the titania precursor 18 vapors and carries the vapors through a distribution system 24 to manifold 14, where they are mixed with the silica precursor 6 vapors. The mixture of vaporous precursors passes through heated fume lines 26 to deposition burners 28 positioned below a multi-chambered hood 32. The temperatures of the fume lines 26 are preferably controlled to prevent reaction prior to reaching the deposition burners 28.

Prior to injecting the mixture into the deposition burners 28, a bait 34 is disposed in the center chamber 33 of the multi-chambered hood 32. Typically, the bait 34 is made of fused quartz. However, the bait 34 may also be made of other bait materials such as alumina or graphite. Further, the bait 34 may be shaped like a rod, as shown in the drawing, or may have other desired shape. For example, the bait 34 may be shaped like a ball or a plate. The upper end of the bait 34 is connected to a spindle 36, for example, by pin 35. The spindle 36 is in turn connected to a drive motor 38. When the drive motor 38 is energized, the spindle 36 and the bait 34 rotate in unison and ascend within the chamber 33 at predetermined speeds. The speed at which the bait 34 ascends is critical to the temperature profile and shape of the porous preform 40 formed on the bait 34. A typical bait speed is 0.3 to 0.5 mm/min.

Burner placement is fixed and bait speed is adjusted to maintain a constant burner-to-soot preform distance during deposition. Although two deposition burners 28 are shown, it should be clear that one or more than two deposition burners can be used. In general, the number of deposition burners will depend on the size of porous preform to be made. The deposition burners 28 are typically inclined at an angle with respect to the translation axis of the bait 34. Auxiliary heat burners 29 may also be provided to promote the thermal environment needed to form the SiO$_2$—TiO$_2$ particles. Improper placements of the deposition burners 28 and the auxiliary heat burners 29 could result in both excessively hot and cold regions on the preform. The occurrence of these will cause unwanted effects on the density, shape, deposition efficiencies, and other related defects of the preform.

The mixture of vaporous precursors are injected into the deposition burners 28, as previously described. The vaporous precursors exit the deposition burners 28 where they react to form SiO$_2$—TiO$_2$ soot. The soot is formed by hydrolysis or thermal oxidation reaction of the precursors with a methane-oxygen flame. Alternatively, an oxyhydrogen flame could be used to form the soot. The soot is deposited on the lower end of the bait 34 to form a columnar porous preform 40. The lower end of the bait 34 on which the preform is formed is generally spherical in shape but could be planar or have other shape. The perform 40 grows as more soot is deposited and the bait 34 ascends. Spurious soot is generated at the time of deposition and is removed through the exhaust chambers 42. The chamber 33 in which the spindle 36 and bait 34 travel is provided with a stream of clean air 44 that is directed towards the emerging preform 40. This stream of air 44 directs the spurious soot outward and away from the preform 40 into the exhaust chambers 42 which carry it away. This is a critical step in the reduction of physical defects on the preform 40.

After the preform 40 is formed, the process is shut-down and the preform 40 is removed to an environmentally controlled storage area (not shown) where it will await consolidation process and, if needed, an intermediate chlorine treatment step. The consolidation of the porous preform 40 into a dense glass involves heating the preform to consolidation temperatures, typically 1200 to 1900° C. with preferred values in a range from 1300 to 1700° C., in vacuum or at atmospheric pressure. Chlorine treatment involves heating the porous preform 40 in chlorine gas, usually in the presence of an inert gas such as helium. Chlorine treatment is generally best at temperatures just prior to consolidation of the preform 40, typically 900 to 1100° C. The high temperatures allow reaction of metal impurities to form volatile metal chlorides which are removed. Additionally, the chlorine removes OH from the glass structure. Dehydration of the porous preform prior to consolidation can also be accomplished by exposing the porous preform to a fluorinating gas, such as CF$_4$ or SiF$_4$, usually in the presence of an inert gas such as helium.

Figure 2:
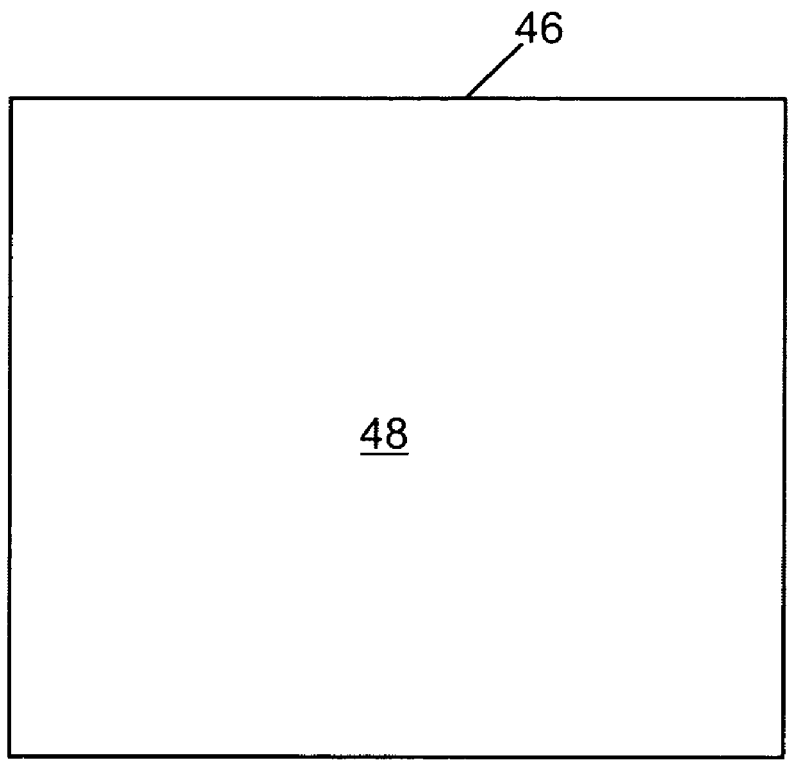
FIG. 2 is a top view of a mask blank.
Figure 3:
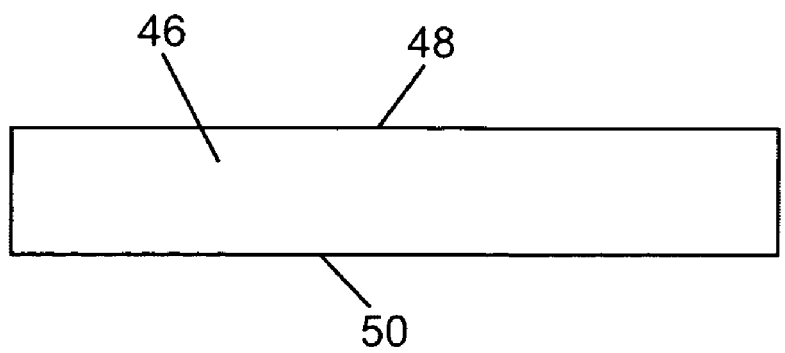
FIG. 3 is a side view of the mask blank shown in FIG. 2.

For applications which require low thermal expansion, the SiO$_2$—TiO$_2$ glass formed by the process above has TiO$_2$ content in a range from 2 to 12% by weight. The weight percent of TiO$_2$ in the glass can be adjusted by changing the amount of titanium precursor 18 delivered to the deposition burners 28. The consolidated preform made by the process above can be finished and used as a mask blank for EUV lithography. Finishing may include cutting the preform into a desired shape, polishing the surface of the preform, and cleaning the preform. FIGS. 2 and 3 show a mask blank 46 having a planar top surface 48 and a planar bottom surface 50. A consolidated preform produced by the process above can be cut as necessary to form the mask blank 46. A mask for EUV lithography can be formed by depositing alternating layers of reflective coating, i.e., Mo/Si or Mo/Be, on the glass substrate and depositing an absorber, e.g., Al or Si, on the multilayer reflective coating.

Dry SiO$_2$—TiO$_2$ glass can be used in fabricating optical elements for infrared transmission in the 700 to 1600 nm wavelength range, and more specifically in the 1200 to 1600 nm wavelength range. Dry SiO$_2$—TiO$_2$ glass can also be used in fabricating optical elements for deep-UV applications such as at 157 nm.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for producing a fused silica glass containing titania, comprising:
    synthesizing particles of silica and titania by delivering a mixture of silica precursor and a titania precursor to a burner;
    growing a columnar porous preform by successively depositing the particles of silica and titania on a deposition surface at a temperature below that temperature required to consolidate the porous preform into dense glass while translating the deposition surface away from the burner; and
    subsequently consolidating the porous preform into dense glass.

2. The method of claim 1, wherein a translation speed of the deposition surface is adjusted to maintain a substantially constant distance between an end portion of the porous preform remote from the deposition surface and the burner during deposition.

3. The method of claim 1, wherein consolidating the porous preform into dense glass comprises heating the porous preform to a temperature in a range from 1200 to 1900° C.

4. The method of claim 1, further comprising dehydrating the porous preform by exposing the porous preform to a heated, halide-containing atmosphere prior to consolidation.

5. The method of claim 4, where in the heated, halide-containing atmosphere comprises chlorine.

6. The method of claim 4, where in the heated, halide-containing atmosphere comprises fluorine.

7. The method of claim 4, wherein the temperature of the heated, halide-containing atmosphere is in a range from 900 to 1100° C.

8. The method of claim 4, wherein a translation speed of the deposition surface is adjusted to maintain a substantially constant distance between an end portion of the porous preform remote from the deposition surface and the burner during deposition.

9. The method of claim 4, wherein consolidating the porous preform into dense glass comprises heating the porous preform to a temperature in a range from 1200 to 1900° C.

10. The method of claim 1, wherein the glass contains 2 to 12% by weight titania.

11. The method of claim 1, wherein the minimum temperature is approximately 1200° C.

12. The method of claim 11, wherein the temperature at which the particles are deposited is approximately 200 to 500° C. less than the minimum temperature.

13. The method of claim 1, wherein, a variation on coefficient of thermal expansion of the dense glass is in a range from −5 ppb/° C. to +5 ppb/° C.

14. The method of claim 1, further comprising rotating the deposition surface relative to the burner while successively depositing the particles on the deposition surface.

* * * * *